United States Patent [19]

Yang

[11] Patent Number: 5,558,427
[45] Date of Patent: Sep. 24, 1996

[54] BASE STRUCTURE FOR A THREE SECTION TYPE THIRD BRAKING LIGHT WHICH CAN BE CONVERTED INTO A TRIANGULAR FAILURE WARNING LIGHT

[76] Inventor: Chang A. Yang, No. 9, Alley 100, Lane 21, Wei-Hu Road, Nei-Hu, Taipei, Taiwan

[21] Appl. No.: 249,129

[22] Filed: May 25, 1994

[51] Int. Cl.[6] .................................... B60Q 1/26
[52] U.S. Cl. .................. 362/80.1; 362/80; 362/83.3; 362/396
[58] Field of Search .......................... 362/74, 78, 80, 362/80.1, 83.3, 287, 382, 396, 427, 457; 340/472, 479

[56] References Cited

U.S. PATENT DOCUMENTS

| | | | |
|---|---|---|---|
| 4,734,675 | 3/1988 | Wen | 362/78 |
| 4,896,251 | 1/1990 | Fasel | 362/80.1 |
| 5,126,926 | 6/1992 | Chiang | 362/80.1 |

FOREIGN PATENT DOCUMENTS

| | | | |
|---|---|---|---|
| 2215450 | 9/1989 | United Kingdom | 362/382 |

*Primary Examiner*—Denise L. Gromada
*Assistant Examiner*—Y. Quach
*Attorney, Agent, or Firm*—Alfred Lei

[57] ABSTRACT

This invention relates to a base structure for a three-section type third braking light which can be converted into a triangular failure warning light. The base structure having a base seat and a supporting seat can be mounted inside the rear windscreen glass of an automobile, and the base seat is provided with pivot axes for the adjustment of the mounting angle of the third braking light supported by the supporting seat. The supporting seat is provided with several engaging projections or Velcro tapes for being conveniently positioning the third braking light which can be converted into a triangular failure warning light when needed if an automobile is in failure.

3 Claims, 7 Drawing Sheets

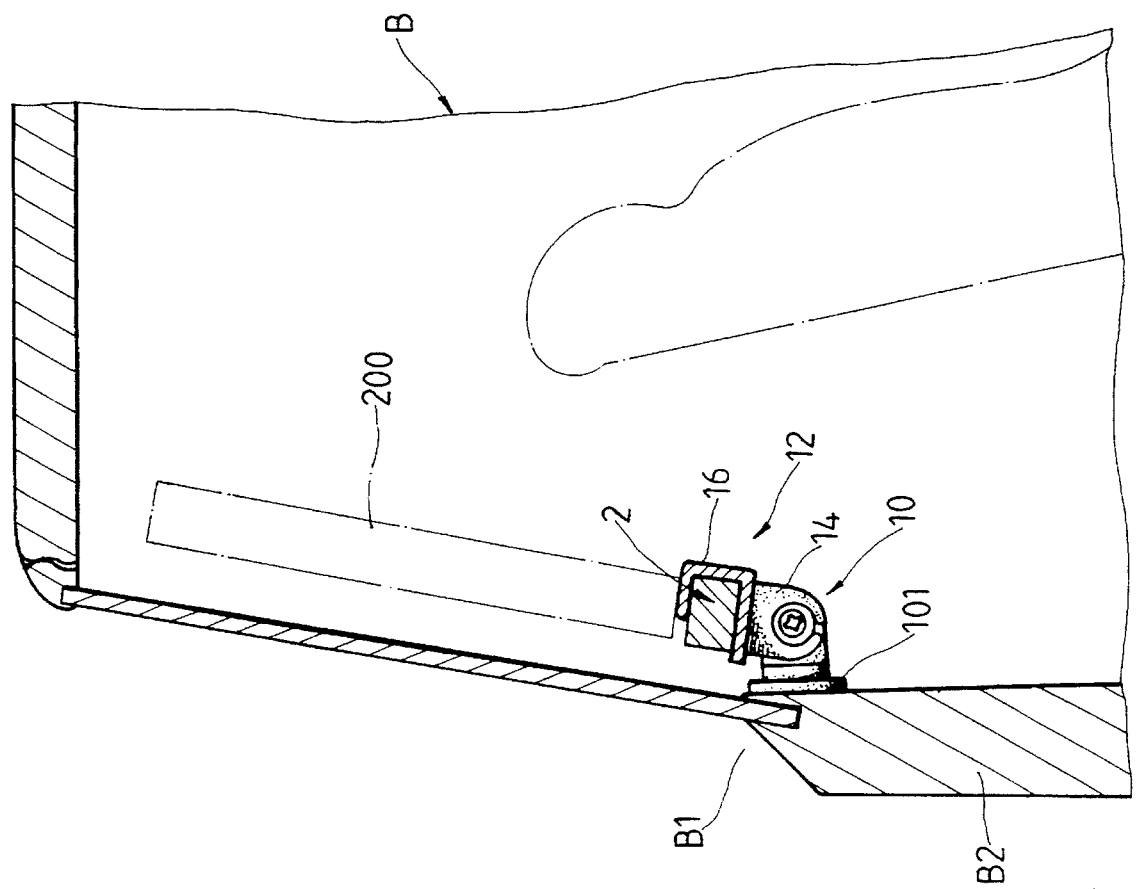

BASE STRUCTURE FOR A THREE SECTION TYPE THIRD BRAKING LIGHT WHICH CAN BE CONVERTED INTO A TRIANGULAR FAILURE WARNING LIGHT

BACKGROUND OF THE INVENTION

This invention relates to a a base structure for a three-section type third braking light which can be converted into a triangular failure warning light; said base structure can be mounted inside the rear windscreen glass of an automobile for mounting the three-section type third braking light at an appropriate position and for helping the operation of the three-section type third braking light.

The aforesaid three-section type third braking light has been disclosed in U.S. Ser. No. 08/086,061 filed by the applicant of this invention on Jul. 6, 1993. According to the U.S. Ser. No. 08/086,061, the three-section type third braking light can be converted into a triangular failure warning light when needed, and said failure warning light can improve the poor visual and warning effect of the conventional warning sign of reflection type and can replace the conventional warning sign of reflection type due to the fact that said failure warning light can be put on a higher position and thus provides a better visual angle and also provides visible flashing light.

The aforesaid three-section type third braking light which can be convened into a failure warning light when needed can be used to effectively warn the other automobiles behind the failure automobile to prevent the other automobile from colliding with the failure automobile in order to increase the safety of the drivers.

The aforesaid three-section type third braking light disclosed in the U.S. Ser. No. 08/086,061 is mounted in the rear turbulence plate of an automobile and by means of pulling-out, positioning, folding and locking means, the three-section type third braking light can be folded into a failure warning light standing on the rear turbulence plate and providing "LED" flashing light.

SUMMARY OF THE INVENTION

However, not all the tails of automobiles have rear turbulence plates. Therefore, for widening the application field of the aforesaid three-section type third braking light, this inventor designs a base structure for mounting the aforesaid three-section type third braking light inside the rear windscreen glass of the automobiles having no turbulence plates such that the light of the three-section type third braking light can be emitted through the rear windscreen glass.

A main object of this application is to provide a base structure for mounting a three-section type third braking light inside the rear windscreen glass of automobiles having no turbulence plate and the base structure can be used to adjust the mounting angle of the three-section type third braking light in order to match different slant angles of the rear windscreen glass whereby the automobiles having no turbulence plates also can utilize the advantage of the three-section type third braking light.

According to this invention, the three-section type third braking light is combined with the base structure having a base seat and a supporting seat which can be used to adjust the mounting angle of the three-section type third braking light. The base structure is mounted inside the rear windscreen glass of the automobile at an appropriate position for mounting the three-section type third braking light which can be converted into a triangular failure warning light if needed.

BRIEF DESCRIPTION OF THE INVENTION

A complete understanding of the invention may be obtained from the following detailed description when read in conjunction with the appended drawings, in which:

FIGS. 7 is a sectional view showing the device of this invention mounted inside of the rear windscreen glass of a lift back.

DETAILED DESCRIPTION OF THE DRAWING

Figure 1:
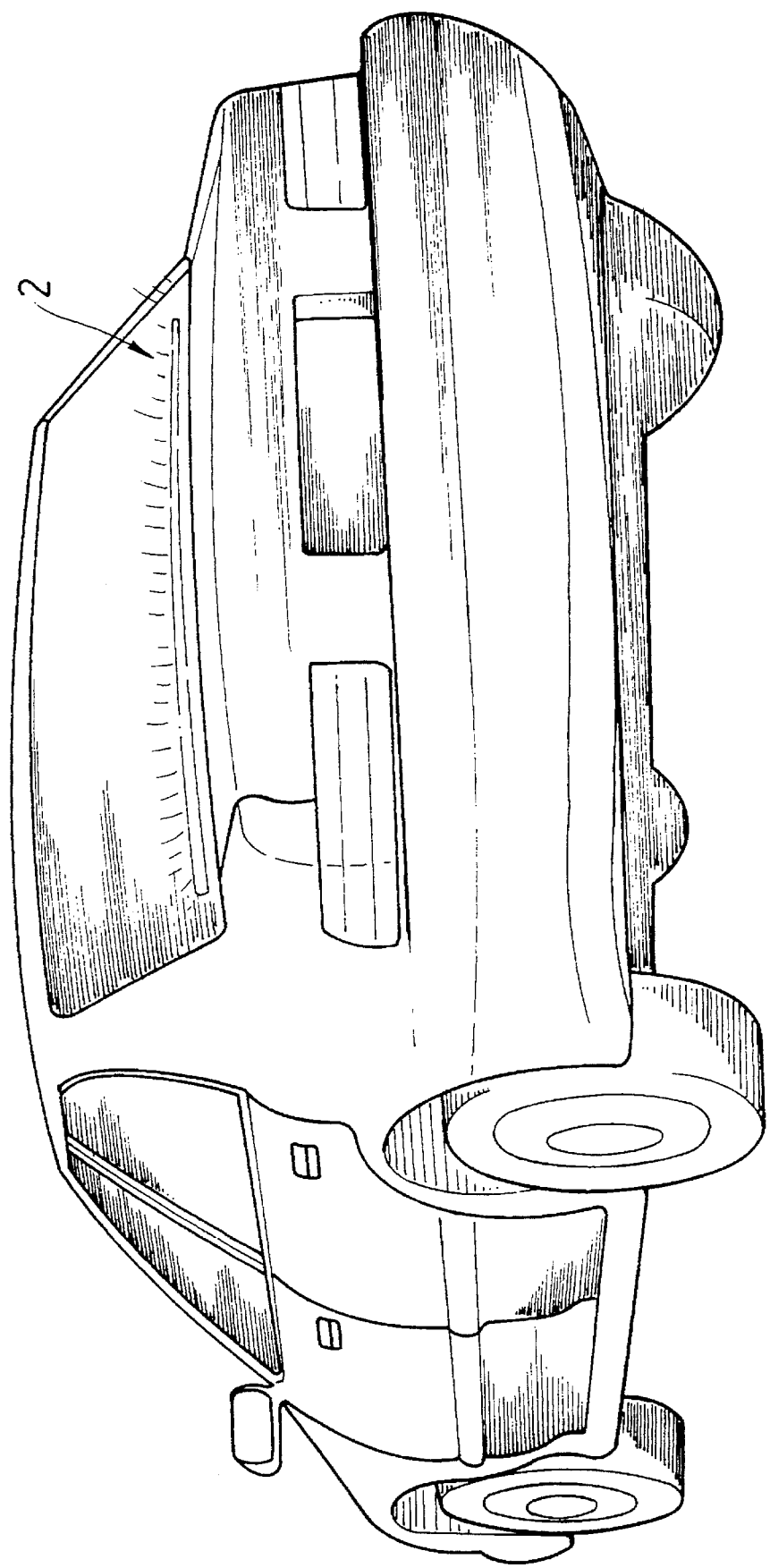
FIG. 1 is a schematic view showing a three-section type third braking light in use condition in accordance with this invention.
Figure 2:
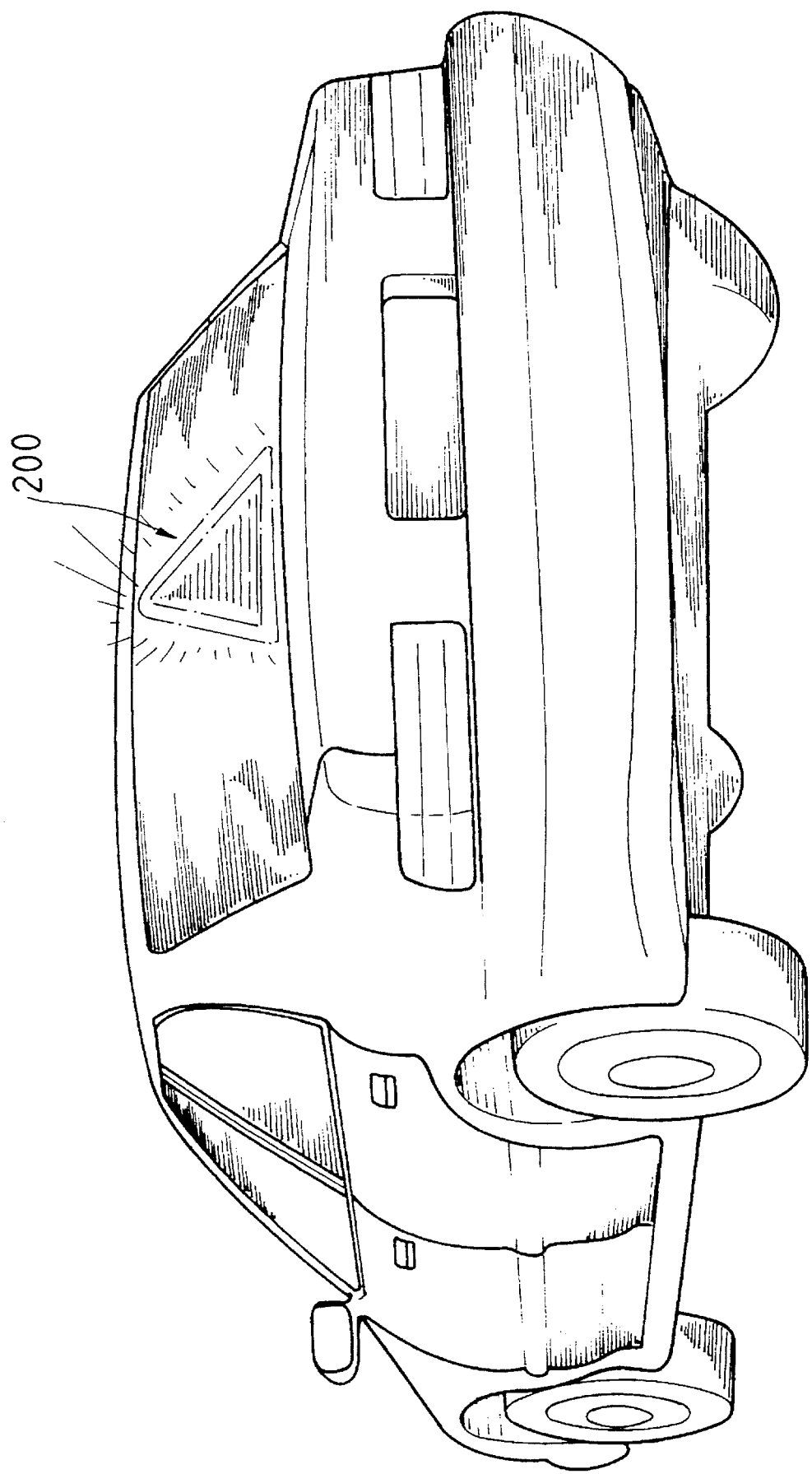
FIG. 2 is a schematic view showing a triangular warning light in use condition in accordance with this invention.

Please refer to FIGS. 1 and 2 showing a device according to this invention which is mounted inside of the rear windscreen glass of an automobile. FIG. 1 illustrates an elongate three-section type third braking light (2) which can be used during the normal driving of an automobile, and when automobile is in failure or must be stopped in road due to other reasons, for warning the other automobiles behind the stopped automobile and increasing the safety of the stopped automobile, the third braking light (2) can be folded into a triangular warning light (200) which can flash with attention-getting light.

Figure 3:
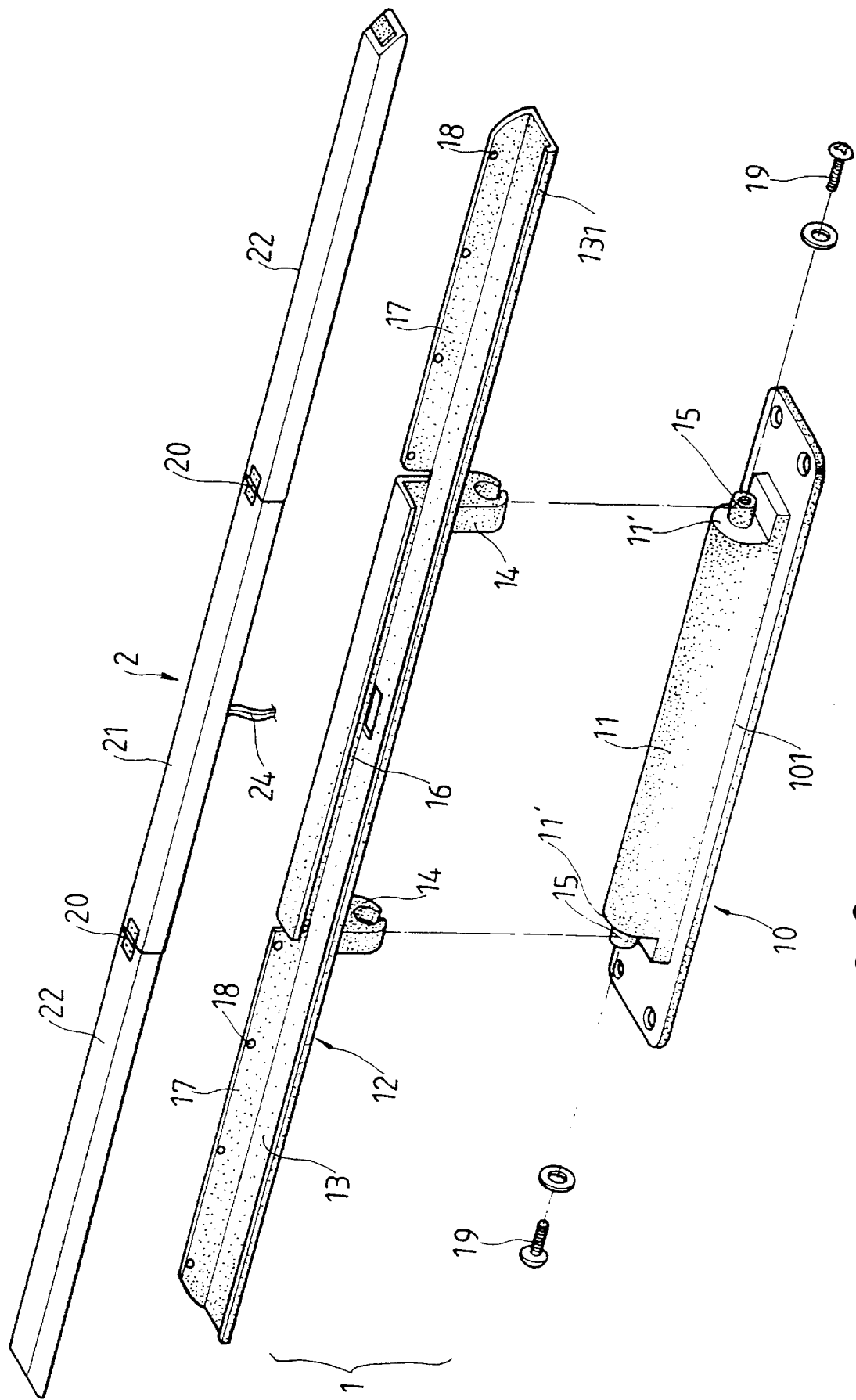
FIG. 3 is an exploded view of the embodiment of FIG. 1 of this invention.

For mounting the three-section type third braking light inside of the rear windscreen glass of an automobile, a base structure is needed as shown in FIG. 3. The base structure (1) of this invention includes a base seat (10), a supporting seat (12) and a positioning screw (19), and can be combined with the three-section type third braking light (2). The base seat (10) and the supporting seat (12) are connected together by means of lugs (14) engaging with pivot pins (15) of a pivot seat (11). The pivot seat (11) includes a left side surface (11') and a right side surface (11'). A fixing plate (101) provided at the bottom of the base seat (10) can be fixed onto a fixing surface in the interior of the automobile. The supporting seat (12) is an elongate seat and its section is of "C" or "L" shape. The outer edge of the base plate (13) of the supporting seat (12) is a upward projecting edge (131). The middle of the support rag seat (12) is a clamping portion (16) of which the section is C shape while the two outer ends of the supporting seat are engaging portions (17) of which the section is L shape. The edge of the inner side wall of the engaging portion (17) is provided with several projections (18). The lugs (14) are engaged with the pivot pins (15) of the pivot seat (11) and can be rotated with respect to the pivot axes. Further, a screw (19) is used to fix the connection between the lugs (14) and the pivot pins (15).

Figure 4:
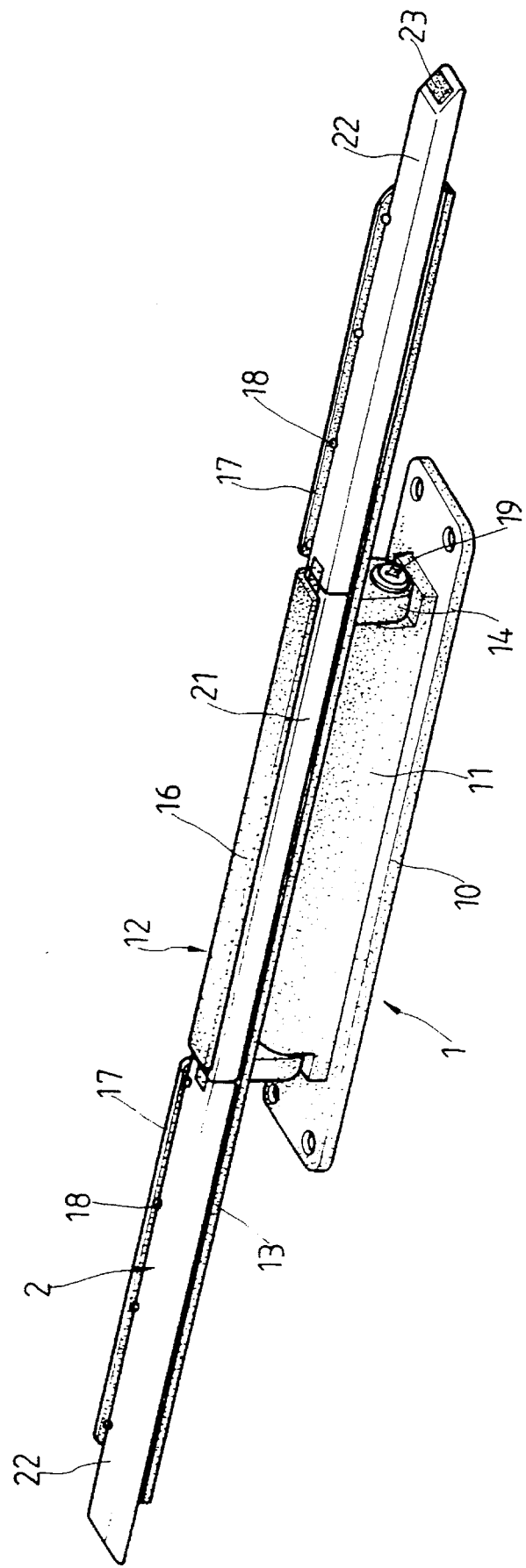
FIG. 4 is a perspective view of the base structure of this invention combined with a three-section type third braking light.
Figure 5:
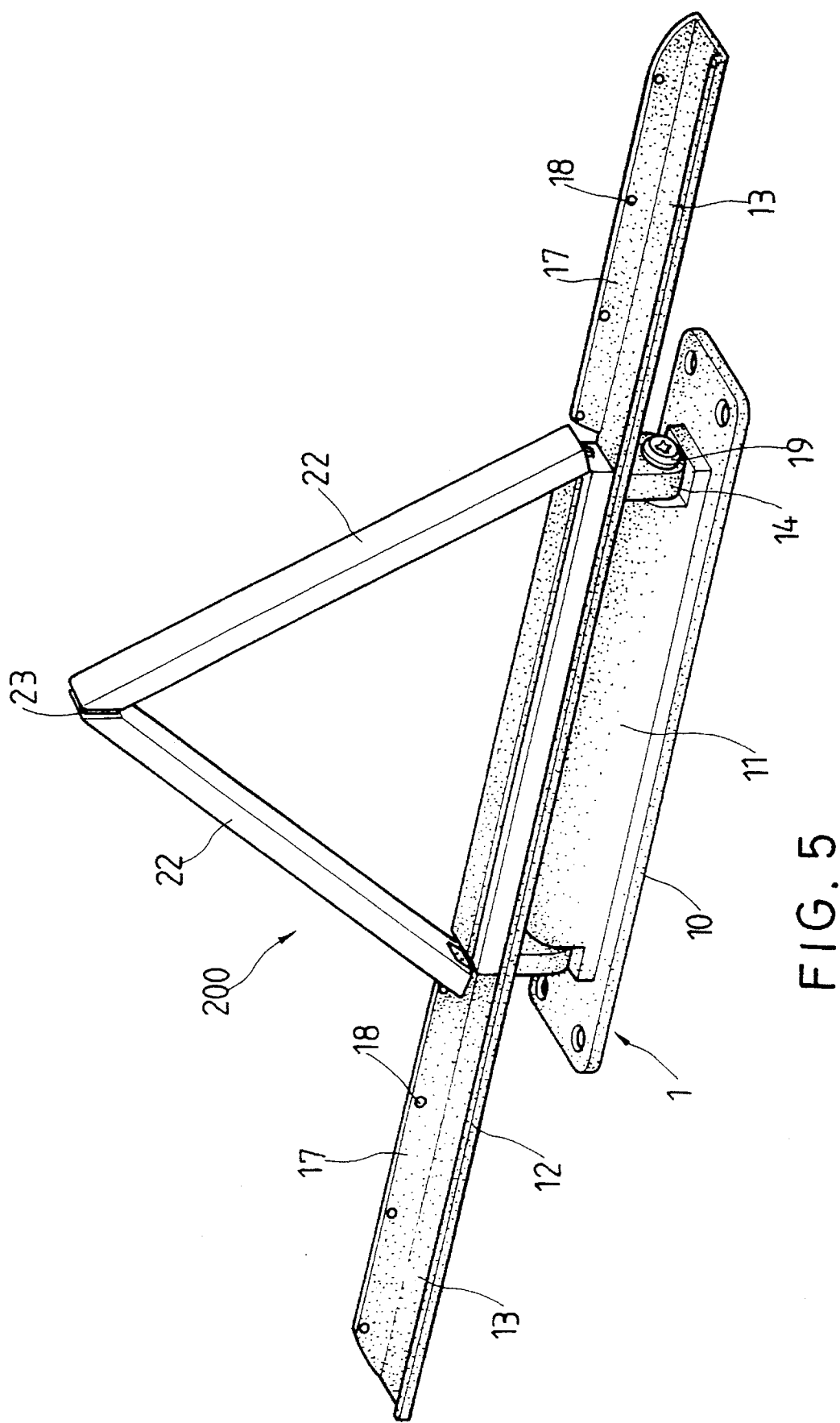
FIG. 5 is a perspective view of the triangular warning light combined with the base structure of this invention.

The middle section (21) of the three-section type third braking light (2) is damped by the clamping portion (16) and the left and right sections (22) of the three-section type third braking light are temporarily engaged with the engaging portions (17) by means of the projections (18) and the elasticity of the engaging portions (17) per se. As shown in FIG. 4, the three-section type third braking light is fixed onto the supporting seat (12) so as to form an "LED" third braking light When needing the failure warning light, the left and light sections (22) of the three section type third braking light (2) can be folded upward such that the magnetic blocks (23) respectively provided on the left and right sections (22) can be attracted together to form a failure warning light of an equilateral triangular shape which can flash with attention-getting light (as shown in FIG. 5). The left and right sections (22) of the three-section type third braking light can be folded by means of hinges (20) after the left and light sections (22) overcome the resilient engagement of the projections (18) and are separated from the engaging portion (17), and when wanting to recover the three-section type third braking light, the left and light sections (22) can be presses into the engaging portions (17) and be fixed and positioned thereon.

Figure 6:
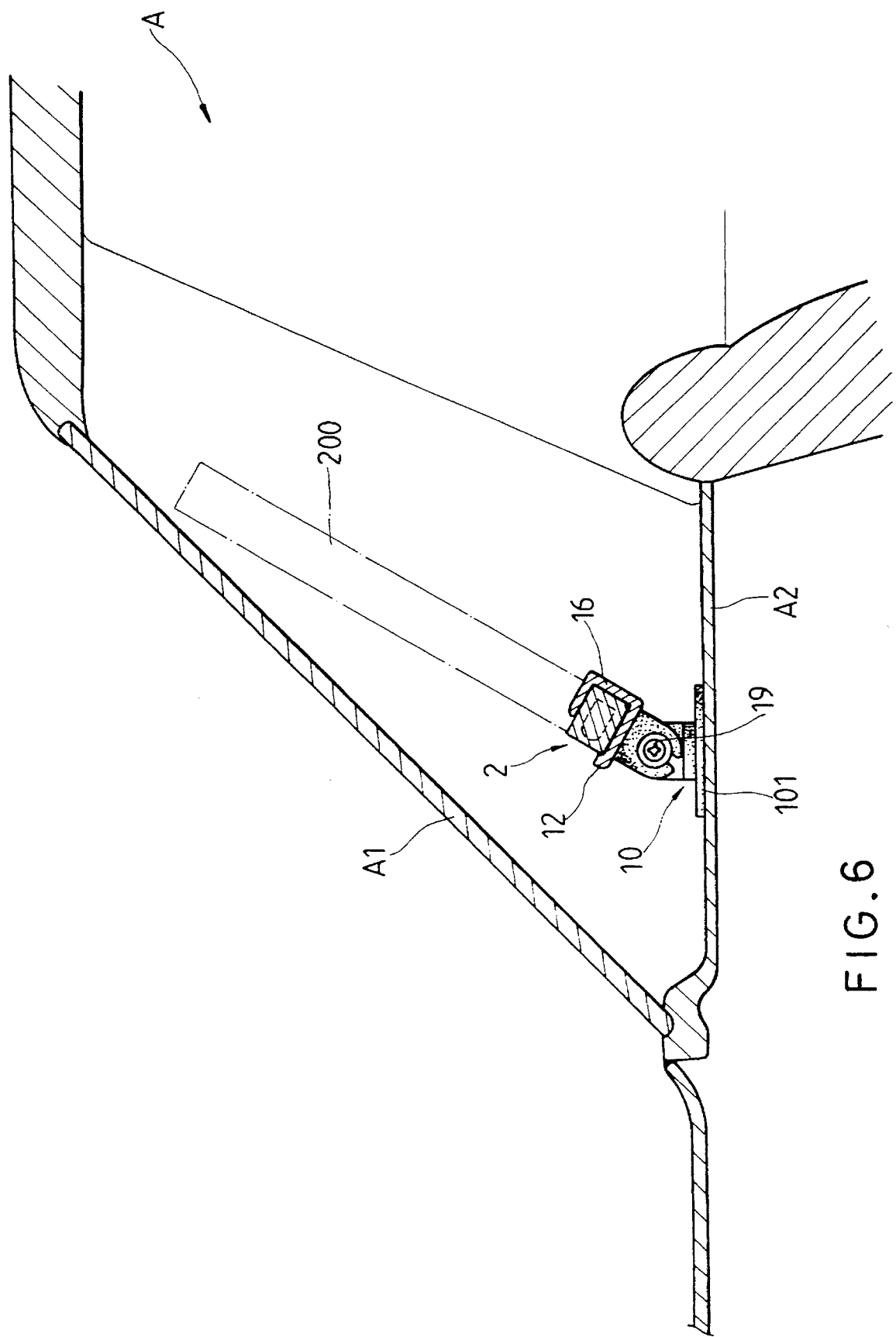
FIG. 6 is a schematic view showing the device of this invention mounted in an automobile.

As shown in FIG. 6, the device of this invention is mounted on a plate (A2) of the rear seat inside of the rear windscreen glass (A1). The supporting seat (12) can be pivotally connected with the base seat (10) and positioned at an appropriate angle so as to satisfy various automobiles of which the rear windscreen glass have different slant angles.

As shown in FIG. 7, the base structure (1) of this invention is mounted on the inner wall of a door plate (B2) inside of the rear windscreen glass (B1) of a station wagon (B). The supporting seat (12) is mounted on the base seat (10) at an included angle which is about 90° such that the three-section type third braking light can be seen from the outside of the windscreen glass.

The left and right sections (22) of the three-section third braking light (2) are resiliently engaged with the supporting seat (12) by means of the projection (18) on the supporting seat (12). Optionally, the bottom surface of the left and light sections (22) and the corresponding top surface of the base plate (13) can be provided with Velcro tapes (not shown in the drawings) such that the left and light sections (22) can be engaged with the base plate (13) when the former are horizontally expanded, and when wanting to fold the three-section third braking light into a triangular failure warning light, the user can simply move the left and light sections (22) upwardly and then the left and light sections (22) will separate from the Velcro tapes on the base plate (13).

Further, the aforesaid base seat (10) can be divided into two small base seats each having a fixing plate (101) and a pivot seat (11) and a pivot pin (15) which can be pivotally engaged with the lug (14), and being mounted at an appropriate place.

To sum up the above, this invention provides a base structure mounted inside the rear windscreen glass for a three-section type third braking light which can be converted into a triangular failure warning light. The base structure is novel and practical and can widen the application field of the three-section type third braking light.

I claim:

1. A base structure for a three-section type third braking light which can be converted into a triangular failure warning light, said base structure being mounted inside a rear windscreen glass of an automobile at an appropriate position, characterized by:

a base seat, having a fixing plate such that said base seat can be mounted on at least one of a horizontal and a vertical surface of the automobile; said fixing plate being provided with a pivot seat having a left and right side surface and projecting pins respectively provided on a center of the left and right side surfaces of said pivot seat; and a supporting seat in an elongate form for supporting the three-section type third braking light, a bottom of said supporting seat being provided with two lugs for being pivotally connected to said projecting pins of said pivot seat; said supporting seat including three portions in which a middle portion is a clamping section for fixing a middle section of said three-section type third braking light and the left and right portions are resiliently engaged with the left and right sections of said three-section type third braking light.

2. The base structure for a three-section type third braking light which can be converted into a triangular failure warning light as claimed in claim 1 wherein the clamping section of said supporting seat can be a C shape while the section of the left and right portions of said supporting seat can be a L shape; and a plurality of projections are provided on an edge of an inner wall of the left and right portions for being resiliently engaged with the left and right sections of said third braking light.

3. The base structure for a three-section type third braking light which can be converted into a triangular failure warning light as claimed in claim 1 wherein the mounting angle of said supporting seat can be adjusted by means of the pivotal connection between said supporting seat and said pivot seat and screws can be used to secure said supporting seat at an appropriate position after the mounting angle of said supporting seat has been adjusted.

* * * * *